US011576385B2

(12) United States Patent
Jiang et al.

(10) Patent No.: US 11,576,385 B2
(45) Date of Patent: Feb. 14, 2023

(54) METHOD FOR INCREASING WHEAT YIELD AND PREVENTING WHEAT DISEASES AND USE THEREOF

(71) Applicant: HuaZhong Agricultural University, Wuhan (CN)

(72) Inventors: Daohong Jiang, Wuhan (CN); Binnian Tian, Wuhan (CN); Jiatao Xie, Wuhan (CN); Yanping Fu, Wuhan (CN); Jiasen Cheng, Wuhan (CN); Tao Chen, Wuhan (CN)

(73) Assignee: Huazhong Agricultural University, Wuhan (CN)

( * ) Notice: Subject to any disclaimer, the term of this patent is extended or adjusted under 35 U.S.C. 154(b) by 235 days.

(21) Appl. No.: 16/856,583

(22) Filed: Apr. 23, 2020

(65) Prior Publication Data

US 2020/0367507 A1 Nov. 26, 2020

(30) Foreign Application Priority Data

May 23, 2019 (CN) ......................... 201910435218.2

(51) Int. Cl.
*A01N 63/30* (2020.01)

(52) U.S. Cl.
CPC .................................... *A01N 63/30* (2020.01)

(58) Field of Classification Search
None
See application file for complete search history.

(56) References Cited

PUBLICATIONS

Wikipedia—S. sclerotiorum (Year: 2022).*

Tuite et al. "Wheat Scab in Soft Red Winter Wheat in Indiana in 1986 and Its Relation to Some Quality Measurements" Plant Disease/ vol. 74 No. 12, Dec. 1990, pp. 959-962.

Cheng et al. Damage of wheat Fusarium head blight( FHB) epidemics and genetic improvement of wheat for scab resistance in China, (Jinangsu J of Agri. Sci.) 2012, 28(5) pp. 938-942, China Journal Electronic Publishing House.

* cited by examiner

*Primary Examiner* — Alton N Pryor

(74) *Attorney, Agent, or Firm* — ArentFox Schiff LLP; Michael Fainberg

(57) ABSTRACT

The present invention provides a method for increasing wheat yield and preventing wheat diseases and use thereof, and relates to the technical field of crop cultivation. In the method, wheat seeds are primed by a fermentation liquid of *S. sclerotiorum*, and the concentration of the fermentation liquid is $1.4\times10^5$ cfu/mL or more. According to the present invention, the wheat seeds are primed by using *S. sclerotiorum*, and *S. sclerotiorum* can endogenously grow in wheat plants to induce expression of genes related to disease resistance and development of wheat, thereby achieving the objective of controlling diseases such as wheat *Fusarium* head blight and improving wheat yield.

11 Claims, 14 Drawing Sheets

Specification includes a Sequence Listing.

Treated by DT-8 Untreated

Treated by DT-8VF

Untreated

METHOD FOR INCREASING WHEAT YIELD AND PREVENTING WHEAT DISEASES AND USE THEREOF

TECHNICAL FIELD

The present invention relates to the technical field of crop cultivation, and in particular to a method for increasing wheat yield and preventing wheat diseases and use thereof.

BACKGROUND

Wheat is one of the most important food crops in the world, providing about 20% of food for human beings and feeding 40% of the world population. The wheat planting area in China is about 24 million hectares (Liu et al., 2018) and the output is 13 billion tons. The total planting area and total output account for about 11% and 17% of the world respectively. Fungal diseases are a great threat in wheat production. *Fusarium* head blight (FHB) and stripe rust are the most common diseases, causing the most serious damage.

FHB is caused by fungi such as *Fusarium graminearum* and *F. asiaticum*. China is the "worst-hit area" with a high incidence of FHB. The average yield loss in the middle and lower reaches of the Yangtze river is 5%-10% in normal years and even no grain is reaped in severe years (Cheng et al., 2012). FHB causes not only substantial reduction in yield, but also decrease in quality by contamination with Deoxynivalenol (DON) toxin. Furthermore, the infection to the grain reduces seed germination and causes seedling blight (Tuite et al., 1990). Due to the lack of effective sources of resistance worldwide, FHB is mainly controlled by spraying chemical agents at the flowering stage.

Stripe rust is one of the most severe diseases to wheat in China. Wheat stripe rust is caused by *Puccinia striiformis* and is a typical airborne disease; the pathogen can spread over a long distance by high-altitude air flow and attack wheat rapidly. For the control of stripe rust, planting resistant varieties is the most economical and effective way. In actual production, the use of chemical pesticides for seed coating and foliar spraying is still an important measure to control wheat stripe rust.

The use of chemical agents to control diseases poses a threat to the survival of beneficial microorganisms and human health. The long-term and excessive use of the chemical agents easily causes resistance of the pathogen groups. On the other hand, labour shortage is currently a great social problem to agricultural production.

SUMMARY

In order to cooperate with the green and simplified wheat cultivation technology, the present invention provides a novel, green, easily-applied and labour-saving method for preventing diseases and increasing yield.

In order to achieve the objective, the present invention provides the following technical solution:

The present invention provides a method for increasing wheat yield and preventing wheat diseases, where wheat seeds are primed by a fermentation liquid of *S. sclerotiorum*, and the concentration of the fermentation liquid of *S. sclerotiorum* is $1.4\times10^5$ colony-forming per unit/millilitre (cfu/mL) or more.

Preferably, the *S. sclerotiorum* includes a hypovirulent strain DT-8 and/or a virulent strain DT-8VF.

Preferably, a method for preparing the fermentation liquid of *S. sclerotiorum* includes:

Inoculating the *S. sclerotiorum* strain into a liquid culture medium, and fermenting at 18-22° C. to obtain a fermentation liquid of the *S. sclerotiorum* hypovirulent strain DT-8 or virulent strain DT-8VF with the concentration of $1.4\times10^5$ cfu/mL or more.

Preferably, the fermentation time is 70-96 hours (h).

Preferably, the fermentation is accompanied by stirring, and the stirring speed is 180-210 revolutions per minute (r/min).

The priming of the wheat seeds includes the following steps:

(1): Sterilizing surfaces of wheat seeds and then soaking the wheat seeds in water till the seeds become swell but do not begin to show white buds; and (2): Soaking the water-absorbing wheat seeds for 3-6 h with the fermentation liquid of the *S. sclerotiorum* strain, and then drying to constant weight.

Preferably, in step (1), the soaking time in water is 5-8 h.

Preferably, in step (2), a dosage form of the fermentation liquid of the *S. sclerotiorum* strain is an aqueous suspending agent.

Preferably, in step (2), in addition to the fermentation liquid of the *S. sclerotiorum*, the aqueous suspending agent also includes a preservative, a protective agent and a mildew inhibitor.

Preferably, the ratio of the volume of the fermentation liquid of *S. sclerotiorum* to the weight of the wheat seeds to be treated is 80-150 mL: 1 kg.

The present invention further provides an application method of the foregoing solution in promoting wheat growth, increasing wheat yield and improving disease resistance of wheat by *S. sclerotiorum.*

Compared with the prior art, the present invention has the following beneficial effects:

(1) According to the present invention, the wheat seeds are primed by using *S. sclerotiorum*, and *S. sclerotiorum* can naturally grow in wheat plants to induce expression of genes related to disease resistance and development of wheat, thereby achieving the objective of controlling diseases such as FHB and improving wheat yield.

(2) As shown in the specific embodiment of the present invention, the plant height, flag leaf length, spike length and 1000-grain weight of the wheat plants treated with the present invention are significantly increased compared with those of the nontreated wheat plants at the flowering stage; the chlorophyll content, the photosynthetic rate of wheat flag leaves and the root activity of the wheat plants can also be improved.

(3) As shown in the specific embodiment of the present invention, the resistance to FHB and stripe rust has been improved significantly when the wheat plants were treated with the present invention.

(4) As shown in the specific embodiment of the present invention, the yield of the wheat treated is significantly higher than that of the nontreated wheat by up to 4.28%-17.19%.

Biological Accession Information

A hypovirulent strain DT-8 of *S. sclerotiorum* for increasing wheat yield, when wheat seeds are primed by a fermentation liquid of the *S. sclerotiorum*, the concentration of the fermentation liquid being at least $1.4\times10^5$ colony-forming units per milliliter (cfu/mL) was deposited. (1) The name and address of the depository is China Center for Type Culture Collection, Wuhan University, Wuhan, China; (2) The name and address of the depositor is Zhaohu Li; (3) The date of deposit was May 5, 2019; (4) The identity of the deposit and the accession number given by the depository is CTCC M 2019328; (5) The date of the viability test was May 20, 2019; (6) The procedures used to obtain a sample if the test is not done by the depository were to collect sclerotia from a rape (*Brassica campestris* L.) infected with *S. sclerotiorum* in the field of Yiyang, Hunan province, on May 10, 2008 and culture them; (7) The deposit is capable of reproduction; (8) The biological material is Known and Readily Available to the Public and all restrictions in the access will be irrevocably removed by the Applicant upon granting of the patent; (9) the data supporting the claimed element is attached in the file named "Translation of Deposit".

The virulent strain DT-8VF of *S. sclerotiorum* was deposited in CCTCC in Wuhan University, Wuhan City, China on Nov. 13, 2019, with the accession number: CCTCC M 2019929. (1) The name and address of the depository is China Center for Type Culture Collection, Wuhan University, Wuhan, China; (2) The name and address of the depositor is Zhaohu Li; (3) The date of deposit was Nov. 13, 2019; (4) The identity of the deposit and the accession number given by the depository is CTCC M 2019929; (5) The date of the viability test was Nov. 28, 2019; (6) The procedures used to obtain a sample if the test is not done by the depository were to collect sclerotia from a rape (*Brassica campestris* L.) infected with *S. sclerotiorum* in the field of Yiyang, Hunan province, on May 10, 2008, remove the virus within the strain by hypal tipping, and culture them; (7) The deposit is capable of reproduction; (8) The biological material is Known and Readily Available to the Public and all restrictions in the access will be irrevocably removed by the Applicant upon granting of the patent; (9) the data supporting the claimed element is attached in the file named "Translation of Deposit".

BRIEF DESCRIPTION OF THE DRAWINGS

FIG. 2(A) shows the colonization of *S. sclerotiorum* in wheat roots observed by using a scanning electron microscope; FIG. 2(B) and FIG. 2(C) are partial enlarged views of FIG. 2(A); FIG. 2(D-F) shows the colonization of *S. sclerotiorum* in wheat roots observed by using a transmission electron microscope; pc is wheat root cells; is means a space between root cells; h is hypha of *S. sclerotiorum;*

FIG. 3(A) and FIG. 3(D) show the distribution of SsCaf1 and RFP antibody signals in wheat roots and hypha respectively; FIG. 3(B) and FIG. 3(C) are partial enlarged views of FIG. 3(A); FIG. 3(E) and FIG. 3(F) are partial enlarged views of FIG. 3(D);

FIG. 6(A) shows wheat at the seedling stage; FIG. 6(B) shows wheat at the flowering stage; FIG. 6(C) shows the plant height of wheat at the seedling stage; FIG. 6(D) shows the plant height of wheat at the flowering stage; FIG. 6(E) shows the flag leaf length of wheat at the flowering stage; FIG. 6(F) shows the spike length of wheat; FIG. 6(G) shows the 1000-grain weight of wheat;

FIG. 7(A) shows the photosynthetic rate of the wheat flag leaves; FIG. 7(B) shows the chlorophyll content in wheat flag leaves;

FIG. 9(A) is a schematic disease onset diagram of wheat treated with the hypovirulent strain DT-8 and the control 14 days after infection with *F. gramincarum* strain PH-1; FIG. 9(B) and FIG. 9(C) show the FHB incidences on spikelet of wheat in 2017 and 2018;

FIG. 10(A) and FIG. 10(B) show the FHB incidences on spikelet of wheat in the field experiments in E'zhou City, Hubei Province and Tianzhu County, Gansu Province in 2017, respectively; FIG. 10(C) shows the FHB incidences on spikelet of wheat in the field experiments in Jingmen City and Xiangyang City, Hubei Province in 2018;

FIG. 11(A) and FIG. 11(B) show the DON contents in wheat seeds under natural conditions in Jingmen and Xiangyang City, Hubei Province in 2018, respectively; FIG. 11(C) and FIG. 11(D) show the ZEN contents in wheat seeds under natural conditions in Jingmen and Xiangyang City, Hubei Province in 2018, respectively;

FIG. 12(A) shows the incidence of wheat stripe rust; FIG. 12(B) shows the disease indexes of wheat stripe rust in E'zhou City, Hubei Province and Tianzhu County, Gansu Province in 2017;

FIG. 13(A) shows the colonization of *S. sclerotiorum* in wheat roots observed by using a scanning electron microscope; FIG. 13(B) is a partial enlarged view of FIG. 13(A); FIG. 13(C) shows the colonization of *S. sclerotiorum* in wheat roots observed by using a transmission electron microscope; FIG. 13(D) is a partial enlarged view of FIG. 13(C);

FIG. 15(A) shows wheat at the seedling stage; FIG. 15(B) shows wheat at the flowering stage; FIG. 15(C) shows the plant height of wheat at the seedling stage; FIG. 15(D) shows the plant height of wheat at the flowering stage; FIG. 15(E) shows the flag leaf length of wheat at the flowering stage; FIG. 15(F) shows the spike length of wheat; FIG. 15(G) shows the 1000-grain weight of wheat;

FIG. 16(A) shows the photosynthetic rate of the wheat flag leaves; FIG. 16(B) shows the chlorophyll content in wheat flag leaves;

FIG. 17(A) is a schematic disease onset diagram of wheat treated with strain DT-8 and control 14 days after infection with *F. gramincarum* strain PH-1; FIG. 17(B) and FIG. 17(C) show the FHB incidences on spikelet of wheat in 2017 and 2018, respectively;

FIG. 18(A) shows the FHB incidences on the spikelet of wheat in the field experiments in E'zhou City, Hubei Province in 2017; FIG. 18(B) and FIG. 18(C) show the FHB incidences on spikelet of wheat in the field experiments in Jingmen City and Xiangyang City, Hubei Province in 2018, respectively;

FIG. 19(A) and FIG. 19(B) show the DON contents in wheat seeds under natural conditions in Jingmen City and Xiangyang City, Hubei Province in 2018, respectively; FIG. 19(C) and FIG. 19(D) show the ZEN contents in wheat seeds under natural conditions in Jingmen City and Xiangyang City, Hubei Province in 2018, respectively;

FIG. 20(A) is a schematic diagram of an incidence of wheat stripe rust; FIG. 20(B) shows a disease index of wheat stripe rust in E'zhou City, Hubei Province in 2017.

DESCRIPTION OF THE EMBODIMENTS

Figure 1:
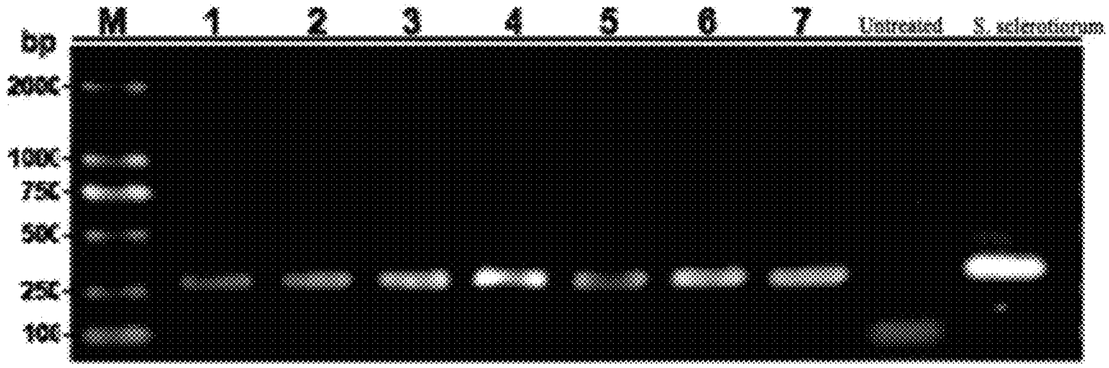
FIG. 1 is an electrophoretogram showing the endogenesis of *S. sclerotiorum* in wheat leaves in Embodiment 2; lane 1 to lane 7 are leaves of wheat treated with *S. sclerotiorum*; the nontreated control is used as a negative control and genomic DNA of *S. sclerotiorum* is used as a positive control.

The present invention provides a method for increasing wheat yield and preventing wheat diseases, where wheat seeds are primed by a fermentation liquid of *S. sclerotiorum*, and the concentration of the fermentation liquid of *S. sclerotiorum* is $1.4\times10^5$ cfu/mL or more.

In the present invention, *S. sclerotiorum* is a hypovirulent strain DT-8 and/or a virulent strain DT-8VF. The hypovirulent strain DT-8 carries DNA virus SsHADV-1 and is obtained from natural field rapeseed plants; the strain DT-8VF is a virus-free derivative of strain DT-8 (Yu et al., 2010). The strains DT-8 and DT-8VF of the present invention have been stored in the CCTCC located in Wuhan University as required, with accession numbers of CCTCC M 2019328 and CCTCC M 2019929, respectively.

As shown in a specific embodiment of the present invention, after priming wheat seeds, strain DT-8 and DT-8VF could grow endogenously in the wheat plants. The endogenous growth can induce differential expression of 58 genes which are related to innate immunity, system acquired resistance, defense response, abscisic acid and jasmonic acid metabolism (Table 1); Furthermore, 107 genes related to plant growth including chloroplast, photosynthetic system, chloroplast starch granule and xanthophylls cycle are differentially induced (Table 2), thus to improve the wheat yield and enhance the disease resistance of wheat plants.

TABLE 1

Disease resistance related genes differentially induced

| GO and pathways (KEGG) | Number of differential genes |
|---|---|
| Innate immunity (GO: 0045087) | 11 |
| System acquired resistance (GO: 0009862) | 5 |
| Defense response (GO: 0006952) | 40 |
| Abscisic acid metabolism (KO: 04075) | 1 |
| Jasmonic acid metabolism (KO: 04075) | 1 |

TABLE 2

Growth promotion-related genes differentially induced

| GO | Number of differential genes |
|---|---|
| Chloroplast (GO: 0009507) | 93 |
| Photosynthetic system (GO: 0009539) | 2 |
| Chloroplast endomembrane (GO: 0009706) | 8 |
| Chloroplast starch granule (GO: 0009569) | 2 |
| Xanthophylls cycle (GO: 0010028) | 2 |

In the present invention, a method for preparing the fermentation liquid of *S. sclerotiorum* includes inoculating the *S. sclerotiorum* into a liquid medium and fermenting at 18-22° C. to obtain a fermentation liquid with the concentration of $1.4\times10^5$ cfu/mL or more.

In the present invention, the liquid medium includes but is not limited to a PDB medium or a broth culture medium. In the present invention, the fermentation temperature of *S. sclerotiorum* is preferably 20° C.; the fermentation time is preferably 55-70 h, more preferably 60-65 h. In the present invention, the fermentation is accompanied by stirring, and the stirring speed is preferably 120-200 r/min, more preferably 150 r/min.

Specifically, in the present invention, the priming of the wheat seeds includes the following steps.

Step (1): Wheat seeds are sterilized and soaked in water till the wheat seeds become swell but do not begin to show white buds.

Step (2): Mix the water-absorbed wheat seeds with the fermentation liquid of *S. sclerotiorum* for 3-6 h, and dry to constant weight.

In the present invention, 84 disinfectant is preferably used for sterilization. In the present invention, the sterilization is performed preferably 2-3 times; and the sterilization time is preferably 5-15 min, more preferably 10 min. After sterilization, the seeds are washed with sterile water to remove the disinfectant on the surface of the seeds.

In the present invention, the soaking time is preferably 5-8 h, more preferably 6 h.

In the present invention, preferably, the fermentation liquid of *S. sclerotiorum* is first prepared into an aqueous suspending agent and then the seeds are soaked. In the present invention, in addition to the fermentation liquid of *S. sclerotiorum*, preferably, the aqueous suspending agent also includes a preservative, a protective agent and a mildew inhibitor. In a specific embodiment of the present invention, the preservative, the protective agent and the mildew inhibitor are streptomycin sulfate, trehalose and liquid paraffin oil, respectively. In the present invention, the mass percentages of the preservative and the protective agent in the aqueous suspending agent are preferably 0.03-0.08% and 2-6%, respectively. A mildew inhibitor layer is preferably added on the surface of the aqueous suspending agent.

In the present invention, the ratio of the volume of the fermentation liquid of *S. sclerotiorum* to the weight of the wheat seeds to be treated is preferably 80-150 mL: 1 kg, more preferably 100 mL:1 kg.

The present invention further provides an application method of the foregoing technical solution in promoting wheat growth, increasing wheat yield and improving disease resistance of wheat by *S. sclerotiorum*. In the present invention, the promotion of wheat growth includes, but is not limited to, promotion of the chlorophyll content in wheat flag leaves, the photosynthetic rate, root activity, the plant height, the flag leaf length, the spike length, and 1000-grain weight etc. In the present invention, the disease resistance of wheat includes, but is not limited to, the resistance to FHB and wheat stripe rust.

The technical solutions provided by the present invention are described in detail below with reference to the embodiments, but the embodiments cannot be construed as limiting the protection scope of the present invention.

Embodiment 1: Priming of Wheat Seeds with the Hypovirulent Strain DT-8 of *S. sclerotiorum*

1. Test materials

Wheat varieties: winter wheat Zheng 9023 and spring wheat Yongliang 4, commercially available.

The hypovirulent strain DT-8 of *S. sclerotiorum*: with DNA virus SsHADV-1.

2. Preparation of a strain DT-8 aqueous suspending agent: The hypovirulent strain DT-8 was cultured in a 50 L fermentation tank at 20° C., 150 r/min and natural pH for 60 h. 0.05% of streptomycin sulfate and 4% of trehalose were added to obtain a fermentation liquid with the concentration of $1.4\times10^5$ cfu/mL or more.

3. Wheat seed priming: Wheat seeds were sterilized with 5% 84 disinfectant for 10 min, and washed with sterile water for three times, 1 min each; the wheat seeds were soaked in sterile water for 6 h till the wheat seeds absorbed water and swelled but did not begin to show white buds. The aqueous suspending agent of hypovirulent strain DT-8 was evenly mixed with the wheat seeds and soaked the wheat seeds for 4 h at room temperature, the dosage was 500 mL of fermentation liquid for every 5 kg of wheat seeds, and then air drying was performed immediately to constant weight.

Embodiment 2: Seed Priming with Hypovirulent Strain DT-8 Helped *S. sclerotiorum* Grow Endogenously in Wheat 1. Detection of *S. sclerotiorum* in Wheat Seedling Leaves by PCR The wheat seeds Zheng 9023 prepared in Embodiment 1 were cultivated in sterilized soil for 45 days. The wheat seedling samples were surface disinfected (with 0.5% sodium hypochlorite for 10 min), washed with distilled water and then washed with phosphate buffer solution (at pH of 7.2) for three times. *S. sclerotiorum* in wheat seedlings was detected.

Genomic DNA extracted from wheat leaves by a CTAB method was used as a template. *S. sclerotiorum* specific primers XJJ21 and XJJ222 (as shown in the Chinese patent ZL200810236958.5, XJJ21: 5'-GTTGCTTTGGCGTG-CTGCTC-3' (as shown in SEQ ID NO: 1); XJJ 222: 5'-CTGACATGGACTCAATAC CAATCTG-3' (as shown in SEQ ID NO: 2) were used as primers to detect *S. sclerotiorum* in wheat leaves by PCR. Genomic DNA of S. *Sclerotiorum* was used as a positive control and the non-treated wheat as a negative control. A PCR procedure includes: annealing at 95° C. for 5 min; 33 cycles of 94° C. for 1 min, 63° C. for 30 s, 72° C. for 30 s, and an extension at 72° C. for 5 min, finally keeping 16° C. for 5 min. PCR products were subjected to agarose gel electrophoresis and ethidium bromide (0.5 μg/mL) staining, and were observed by a gel imaging system. At the same time, the products amplified by PCR were sent to Beijing Tianyi Huiyuan Biotechnology Co., Ltd. for sequencing verification.

The genomic DNA extraction method includes collecting wheat leaves or mycelia of *S. sclerotiorum* strain DT-8 cultured at 20° C. for 2 d, grinding the wheat leaves or mycelia with liquid nitrogen and transferring the ground wheat leaves or mycelia to a 2 mL centrifuge tube, adding 800 μL of preheated 4% CTAB extraction buffer [formula: 4% CTAB, 2% PVP, 100 mM Tris.HCl (at pH of 8.0), 20 mM EDTA (at pH of 8.0), 1.4 M NaCl], and taking a water bath at 65° C. for 15-30 min; centrifuging at a rate of 12000 r/min at room temperature for 10 min; taking the supernatant, adding 2-2.5 times the volume of CTAB precipitation buffer (formula: 1% CTAB, 50 mM Tris.HCl (at pH of 8.0), 10 mM EDTA (at pH of 8.0)], taking a bath at 70° C. for 10 min, and inversing to evenly mix several times during the period; centrifuging at a rate of 12000 r/min at room temperature for 10 min; carefully discarding the supernatant and adding 500 μL of 1 M NaCl to dissolve the precipitate; adding 500 μL chloroform for extraction, inversing to evenly mix, centrifuging at a rate of 12000 r/min for 10 min; taking the supernatant, adding equal-volume precooled isopropanol; centrifuging at a rate of 12000 r/min at room temperature for 10 min; discarding the supernatant, adding 1 mL of 70% ethanol to wash the precipitate, repeating this step once, discarding the residual liquid, and drying in an oven at 37° C. for 10 min; adding 50 μL of deionized water (containing RNase A with a concentration of 25 μg/mL) and dissolving at 37° C. for 5-10 min.

The detection rate of *S. sclerotiorum* in wheat leaves is 100% (FIG. 1), indicating that hyphae of *S. sclerotiorum* can enter wheat plants through seed priming treatment and grow endogenously in wheat plant with the growth of wheat.

Figure 2:
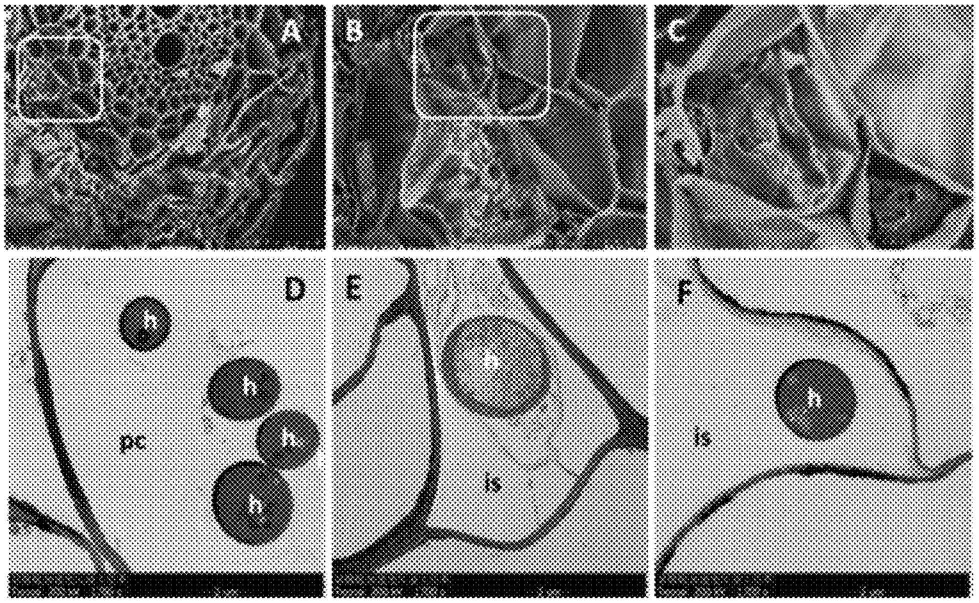
FIG. 2 shows the hyphae of *S. sclerotiorum* strain DT-8 inside the wheat roots observed by an electron microscope in Embodiment 2.

2. Observation of the Endogenous Growth of *S. sclerotiorum* Through Electron Microscopy Wheat primed with the hypovirulent strain DT-8 of *S. sclerotiorum* was cultured on MS medium (Qingdao Hope Bio-Technology Co., Ltd.) for 15 d. Wheat root samples were observed through a scanning electron microscope and a transmission electron microscope. The results showed that hyphae of *S. sclerotiorum* existed in both epidermal cells and stele cells, mainly concentrating in epidermal cells. Hyphae were distributed in the intercellular space of root cells and in the root cells (FIG. 2).

Figure 3:
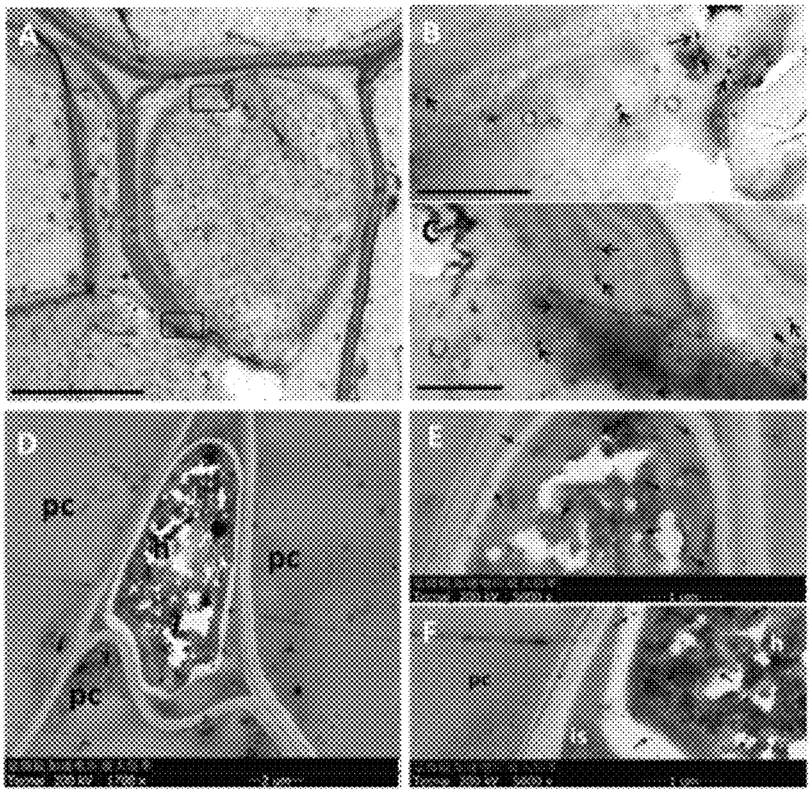
FIG. 3 shows the hyphae of *S. sclerotiorum* DT-8RFP inside the wheat roots observed by an immuno-electron microscope in Embodiment 2.

SsCaf1 is a secretory protein which can be secreted out of *S. sclerotiorum* cells (Xiao et al., 2014). Previously, a polyclonal antibody of SsCaf1 was prepared and a strain DT-8RFP labelled with fluorescent protein was obtained. In order to further verify the endogenesis and the colonization of *S. sclerotiorum* in wheat roots, wheat was inoculated with the strain DT-8RFP and sampled 7 d after inoculation. The root was observed through an immuno-electron microscope. The results showed that SsCaf1 signals were distributed in hyphae of *S. sclerotiorum*, wheat root cells and cell walls, while RFP signals were distributed in hyphae of *S. sclerotiorum* (FIG. 3), indicating that the tubules in wheat roots were hyphae of *S. sclerotiorum* DT-8RFP and *S. sclerotiorum* could grow endophytically in wheat root.

Figure 4:
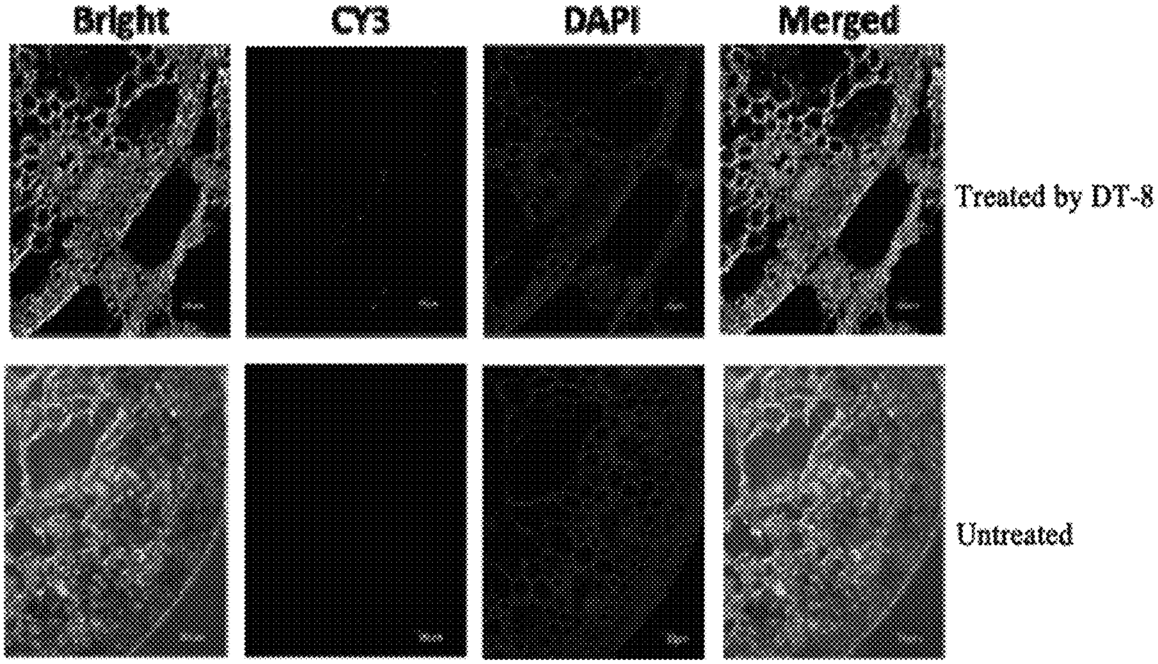
FIG. 4 shows the endophytic growth of *S. sclerotiorum* in wheat stem by in-situ hybridization in Embodiment 2.

3. Observation of the Endogenous Growth of *S. sclerotiorum* in Wheat Stem Through in-situ hybridization Wheat primed with the hypovirulent strain DT-8 were planted for 45 d and stems were sampled and subjected to an in-situ hybridization. PCR amplification was carried out by using the genomic DNA of *S. sclerotiorum* as a template and XJJ21/XJJ222 (patent number: ZL200810236958.5) as primers. The PCR product was labelled with Biotin-14-dUTP (Feinberg, 1984) using a BioPrime DNA Labeling System (invitrogen). The in-situ hybridization was performed. Nucleic acids of *S. sclerotiorum* and wheat stem were stained with 4',6- diamidino-2-phenylindole (DAPI, Sigma, 1 μg/mL) (blue fluorescence), while *S. sclerotiorum* was detected with CY3 (red fluorescence). The overlapping of blue and red fluorescence meant hyphae of *S. sclerotiorum*. The results showed that *S. sclerotiorum* existed in wheat stem primed while not in the nontreated control (FIG. 4).

Embodiment 3: Seed Priming with the Hypovirulent Strain DT-8 Promoted Wheat Growth 1. The Treatment with *S. sclerotiorum* had No Significant Effect on the Germination of Wheat Seeds.

Figure 5:
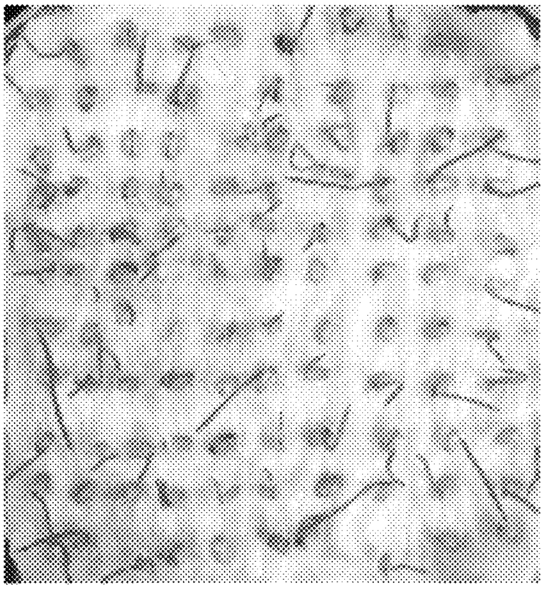
FIG. 5 is the effect of the treatment with the hypovirulent strain DT-8 on the germination of wheat seeds in Embodiment 3.
Figure 5:
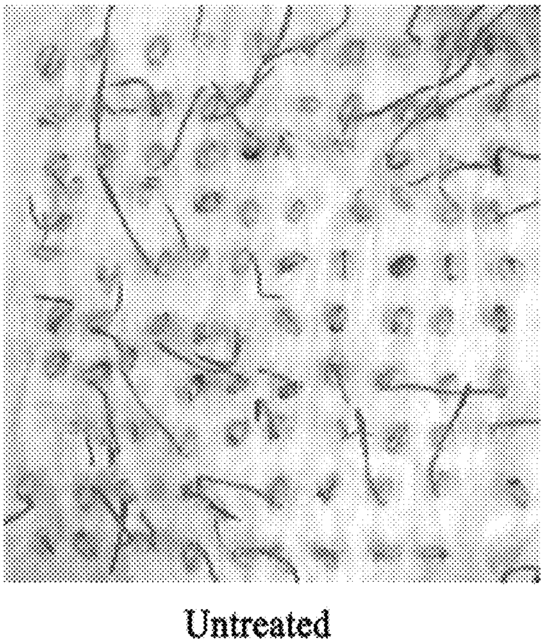

The wheat seeds prepared in Embodiment 1 and the nontreated control were placed on a sterile filter paper to germinate for 5 d at a constant temperature of 20° C. Each treatment had three parallel replicates, and 100 wheat seeds were used for each repetition. The number of germinated seeds was counted. The germination rate of wheat treated with *S. sclerotiorum* was 83% and 84% for the nontreated control (FIG. 5). The results showed that the treatment with *S. sclerotiorum* had no significant effect on the germination of wheat seeds.

2. The Treatment with *S. sclerotiorum* Promoted Wheat Growth

Figure 6:
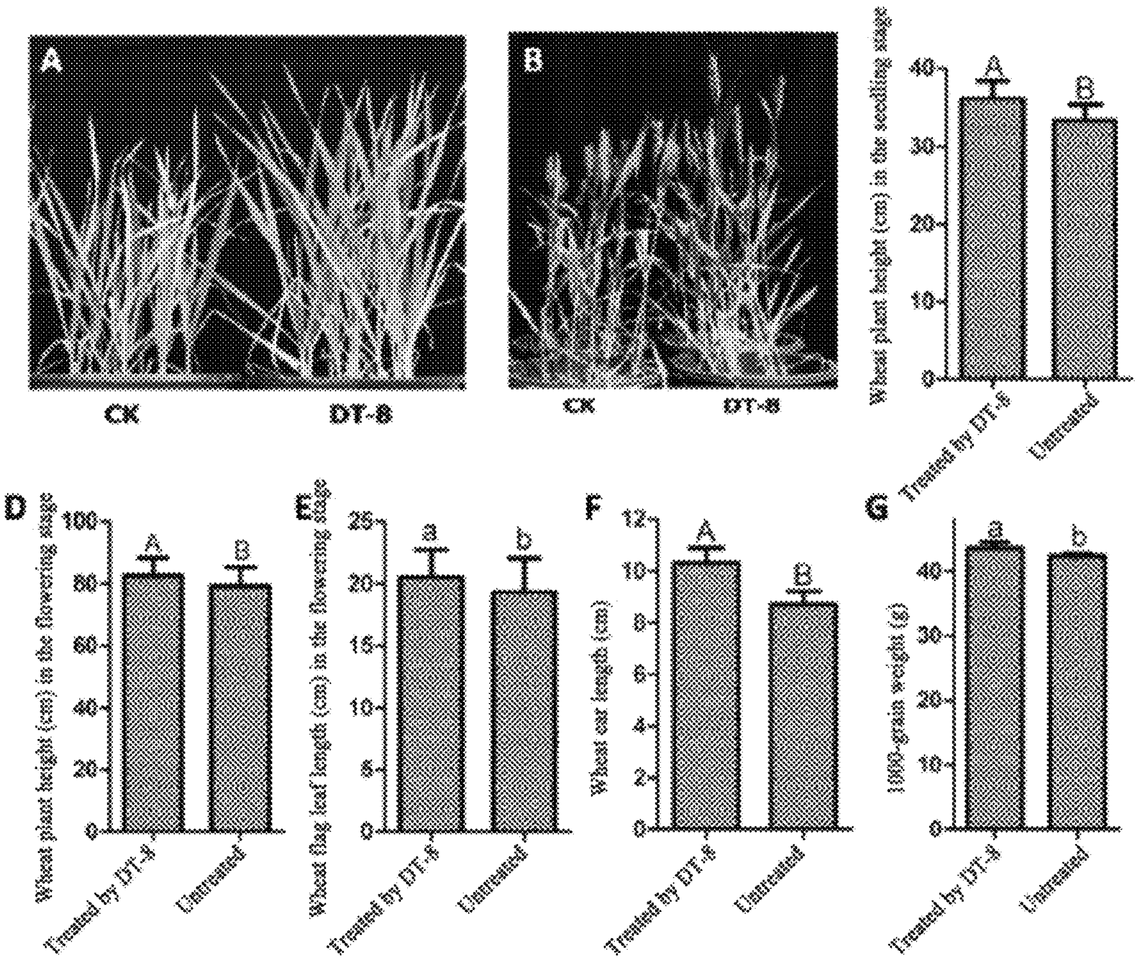
FIG. 6 shows the promotion effect of treatment with the hypovirulent strain DT-8 of *S. sclerotiorum* on the wheat growth in Embodiment 3.

Wheat seeds prepared in Embodiment 1 and the nontreated control were cultivated in pots at 20° C. to observe the growth of wheat plants. The results showed that the plant height of wheat treated with *S sclerotiorum* at the seedling stage was significantly higher than that of the nontreated control. The plant height, the flag leaf length, the spike length and the 1000-grain weight of wheat treated were also significantly higher than those of the nontreated control (FIG. 6).

Figure 7:
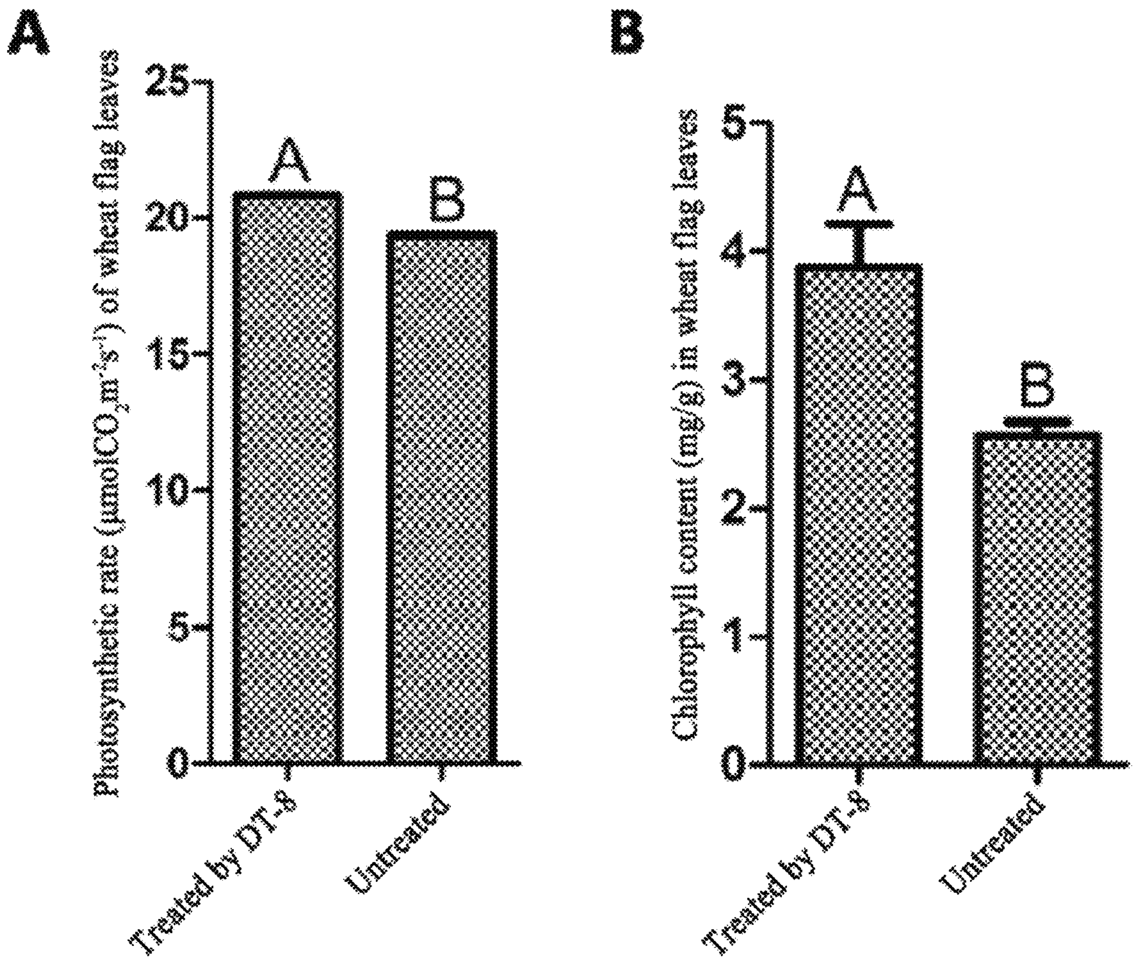
FIG. 7 shows the improvement of the chlorophyll content and photosynthetic rate of wheat flag leaves in wheat treated with the hypovirulent strain DT-8 in Embodiment 3.

3. The Treatment with *S. sclerotiorum* Increased Chlorophyll Content and Photosynthetic Rate in Wheat Flag Leaves Wheat seeds prepared in Embodiment 1 and the nontreated control were planted in the experimental fields in E'zhou City, Hubei Province. The chlorophyll content and photosynthetic rate of the flag leaves of wheat at the flowering stage were measured. The results showed that the chlorophyll content and photosynthetic rate of wheat treated with *S. sclerotiorum* were significantly higher than those of the nontreated control by 51.56% and 7.65%, respectively (FIG. 7).

4. The Treatment with *S. sclerotiorum* Improved Wheat Root Activity

Figure 8:
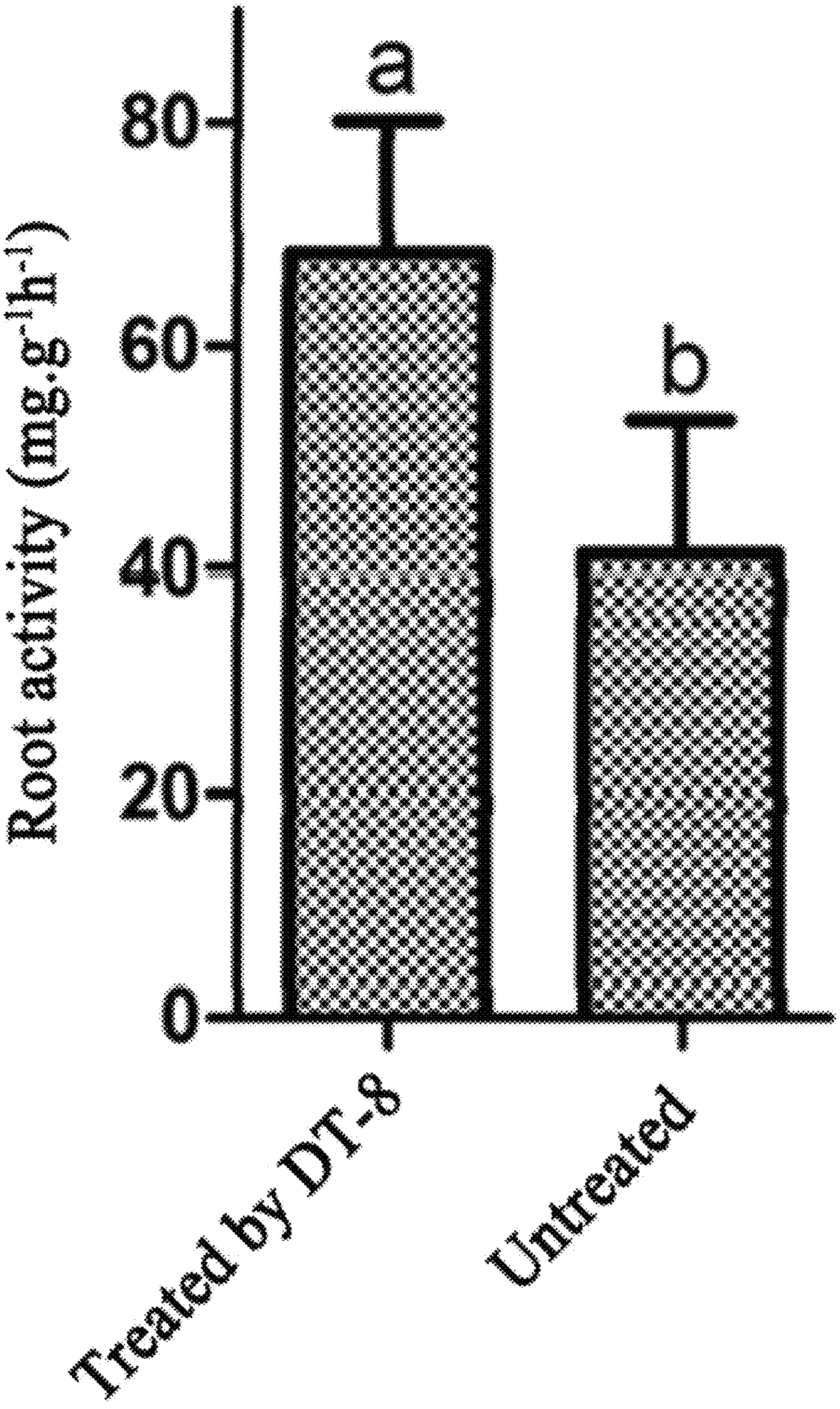
FIG. 8 shows the improvement of wheat root activity in wheat treated with the hypovirulent strain DT-8 in Embodiment 3.

Wheat seeds prepared in Embodiment 1 and the nontreated control were planted in the experimental fields in E'zhou City, Hubei Province and the root activity of wheat plants at the flowering stage was measured. The results showed that the root activity of wheat treated with *S. sclerotiorum* was significantly higher than that of the nontreated control by 65.74% (FIG. 8).

Therefore, seed priming treatment by the hypovirulent strain DT-8 of *S. sclerotiorum* has no significant effect on wheat seed germination. The hypovirulent strain DT-8 of *S. sclerotiorum* can significantly improve the chlorophyll content in flag leaves, the photosynthetic rate and root activity, increase the wheat plant height, flag leaf length, spike length and 1000-grain weight, and has obvious promotion effects on wheat growth.

Figure 9:
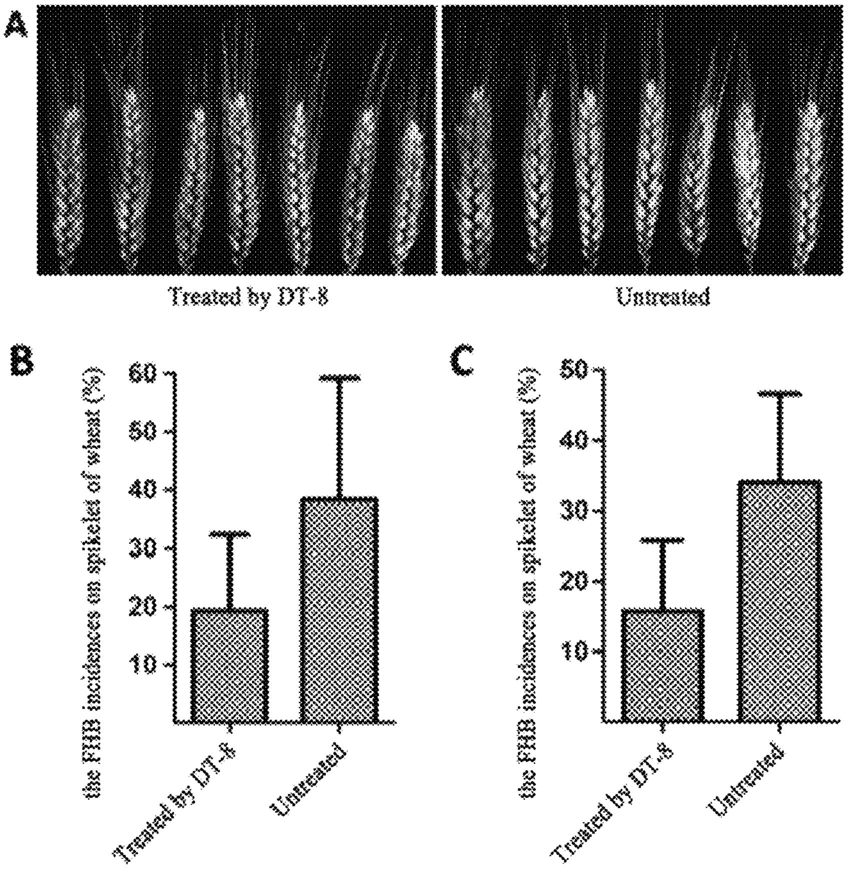
FIG. 9 shows the improvement of resistance to FHB in wheat treated with the hypovirulent strain DT-8 in Embodiment 4.

Embodiment 4: Seed Priming with the Hypovirulent Strain DT-8 Improved Disease Resistance of Wheat 1. Seed Priming with the Hypovirulent Strain DT-8 Improved the Disease Resistance to FHB Wheat seeds prepared in Embodiment 1 and the nontreated control were planted in the experimental fields in E'zhou City, Hubei Province in 2017 and 2018. Conventional field management was carried out and no fungicide was used to control fungal diseases throughout the growth period. The strain PH-1 of *F. gramincarum* was shaking incubated in CMC medium [15 g of carboxyl methyl cellulose (CMC), 1 g of yeast extract, 0.5 g of magnesium sulfate, 1 g of ammonium nitrate, 1 g of potassium dihydrogen phosphate, with distilled water added to a constant volume of 1 L] at 20° C. for 5 d to harvest the spores. The concentration of the spore suspension was adjusted to $10^5$/mL using a Hemocytometer. Artificial inoculation was carried out at the initial flowering stage of wheat: the fourth spikelet from bottom to top was selected, the inner glume was separated, 10 μL of spore suspension was added dropwise by using a pipet, water was sprayed and bagging was carried out to keep the humidity for 3 d, and the number of the diseased spikelets was counted 14 days after inoculation. The results showed that the disease incidence in wheat treated with *S. sclerotiorum* was significantly lower than that of the nontreated control, reducing by 50% (FIG. 9).

Wheat seeds prepared in Embodiment 1 and the nontreated control were cultured in the experimental fields in E'zhou, Hubei Province in 2017 and in Jingmen and Xiangyang, Hubei Province in 2018. Wheat seeds prepared in Embodiment 1 and the nontreated control Yongliang 4 were cultured in the experimental fields in Tianzhu, Gansu Province in 2017. Conventional management was carried out, but no fungicide was used to control fungal diseases. The FHB incidence naturally occurring in 1500 ears was investigated randomly one week before wheat harvest. The investigation method was based on the national standard of FHB field investigation statistics (GB/T 15796-2011).

Figure 10:
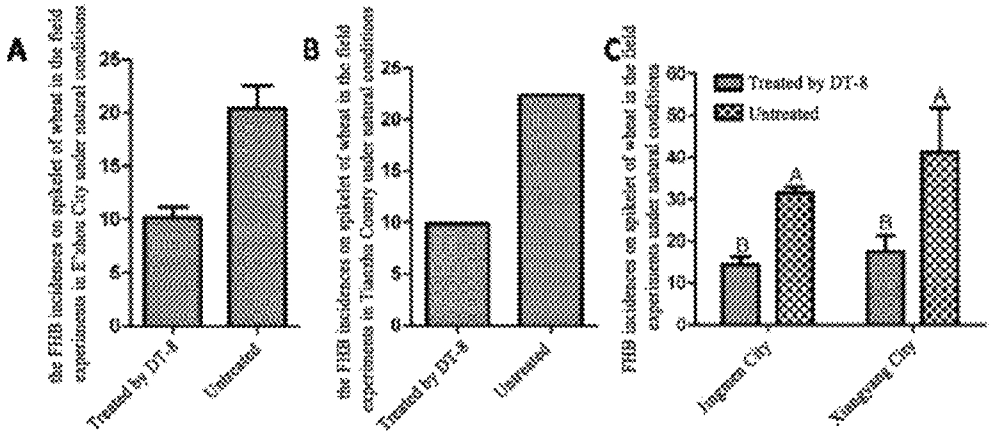
FIG. 10 shows the improvement of resistance to FHB in wheat treated with the hypovirulent strain DT-8 in the field experiments in Embodiment 4.

Survey results showed that the naturally occurring FHB incidences in wheat treated with *S. sclerotiorum* were significantly lower than that of the nontreated control, reducing by more than 50% (FIG. 10).

Figure 11:
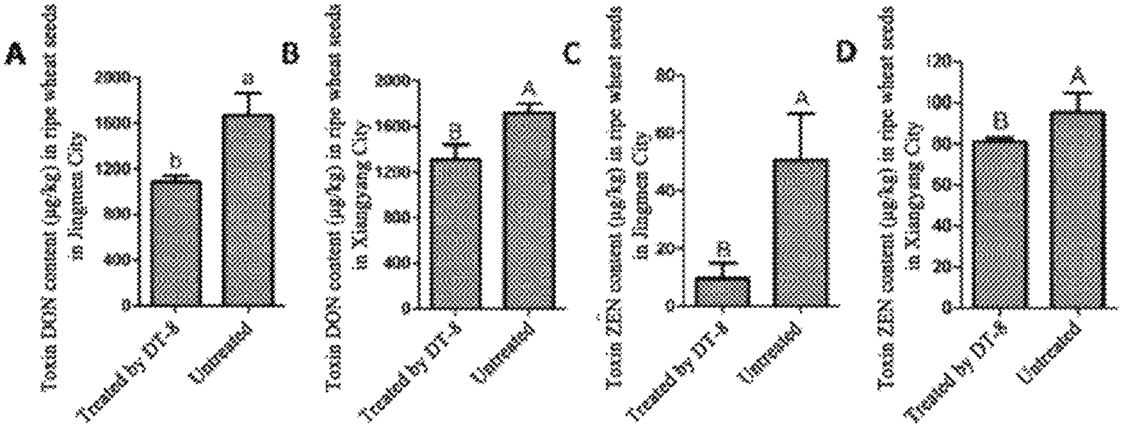
FIG. 11 shows the reduction of the toxin content in wheat seeds primed with the hypovirulent strain DT-8 of *S. sclerotiorum* in the field experiments in Embodiment 4.

*F. gramincarum* not only causes blasted grains, but also forms a large amount of toxin including DON and ZEN in the infected grains. DON is also called vomitoxin which is a neurotoxin and can cause vomiting and diarrhea in human and animal and destroy the immune system. The toxin content in wheat seeds was determined. The results showed that the toxin content in wheat seeds treated with *S. sclerotiorum* in the experimental fields in Jingmen and Xiangyang was significantly lower than that of the nontreated control, reducing by 32.25% and 23.88% for DON, respectively, and by 80.89% and 13.36% for ZEN, respectively (FIG. 11).

The foregoing experiments showed that seed priming treatment with the hypovirulent strain DT-8 of *S. sclerotiorum* could greatly reduce the disease severity of FHB by at least 45% under the conditions of artificial inoculation and natural disease onset in the field, and could also greatly reduce the content of toxin in wheat seeds.

Figure 12:
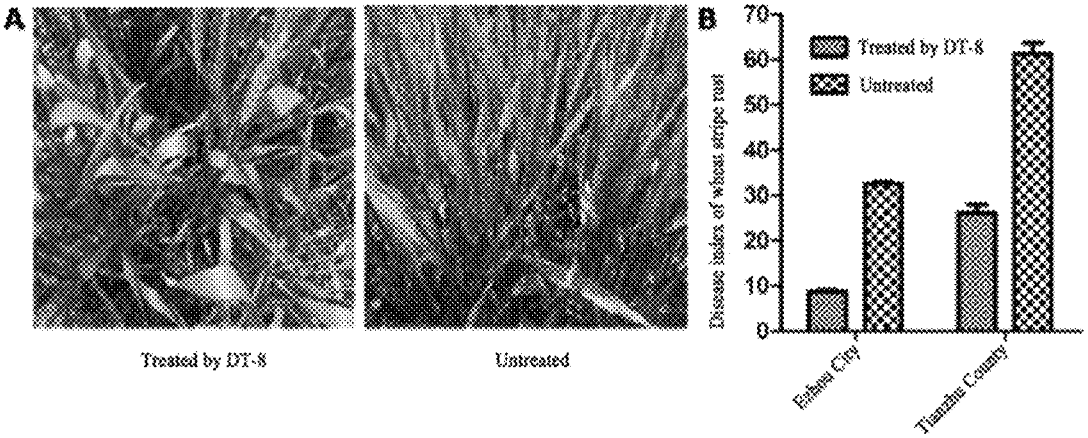
FIG. 12 shows the improvement of resistance to stripe rust in wheat primed with the hypovirulent strain DT-8 of *S. sclerotiorum* in Embodiment 4.

2. Seed Priming with the Hypovirulent Strain DT-8 Improved the Resistance of Wheat to Stripe Rust Wheat rust is a main disease with wide distribution, fast spread and large damage in China. The wheat rust usually spreads widely throughout China and generally reduces production by 20%-30%. In the worst case, almost no grain was harvested. In 2017, wheat seeds prepared in Embodiment 1 and the nontreated control were planted in the experimental fields in E'zhou, Hubei Province (Zheng 9023) and in Tianzhu, Gansu Province (Youliang 4). The outbreak of stripe rust in E'zhou was at the initial flowering stage in 2017, and the full-bloom stage in Tianzhu. The results showed that compared with the nontreated control, the disease indexes of the stripe rust on flag leaves in wheat treated with *S. sclerotiorum* decreased by 73.4% and 57.4%, respectively (FIG. 12).

Embodiment 5: Seed Priming with the Hypovirulent Strain DT-8 of *S. sclerotiorum* Increased Wheat Yield Wheat seeds prepared in Embodiment 1 and the nontreated control were planted for plot experiments in E'zhou, Hubei Province (Zheng 9023) in late October 2016. Six plots were set up for each treatment with each plot 2×25 m. In the middle of April 2017, plot experiments (Yongliang 4) were conducted in Minqin and Tianzhu, Gansu Province. Six plots were set up for each treatment with each plot 2×35 m. In late October 2017, plot experiments (Zheng 9023) were conducted in E'zhou, Jingmen, and Xiangyang, Hubei Province. For the plot experiments in E'zhou and Xiangyang, 6 plots were set up for each treatment with each plot 2×30 m. For the plot experiments in Jingmen, 4 plots were set up for each treatment with each plot 2×45 m. The wheat yield per 5 square meters of field was measured. The results showed that the yields in wheat treated with *S. sclerotiorum* were significantly higher than those in the nontreated control with the yield increasing range from 4.28% to 17.19% (Table 3).

TABLE 3

Wheat yield after treated with hypovirulent strain DT-8 of *S sclerotiorum*

| Time | Variety | Location | Yield: Treated with strain DT-8 (g) | Yield: Nontreated control (g) | Yield increasing (%) |
|---|---|---|---|---|---|
| 2016-2017 | Zheng 9023 | E'zhou, Hubei Province | 1903.50 ± 165.66 | 1808.38 ± 111.71 | 5.36 |
| 2017-2018 | Zheng 9023 | E'zhou, Hubei Province | 2098.26 ± 210.88 | 1790.33 ± 70.22 | 17.19 |
| 2017-2018 | Zheng 9023 | Jingmen, Hubei Province | 2090.10 ± 40.25 | 1890.22 ± 124.36 | 10.58 |
| 2017-2018 | Zheng 9023 | Xiangyang, Hubei Province | 1975.10 ± 76.40 | 1894.75 ± 66.53 | 4.28 |
| 2017 | Yongliang 4 | Tianzhu, Gansu Province | 5132.00 ± 211.99 | 4708.67 ± 84.68 | 8.99 |
| 2017 | Yongliang 4 | Minqin, Gansu Province | 4546.25 ± 164.89 | 4308.75 ± 93.93 | 6.21 |

Embodiment 6: Priming of Wheat Seeds with the Virulent Strain DT-8VF of *S. sclerotiorum*

1. Test materials

Wheat varieties: winter wheat Zheng 9023, commercially available.

Strain DT-8VF: a virulent strain of *S. sclerotiorum*

2. Preparation of strain DT-8VF aqueous suspending agent: The virulent strain DT-8VF was cultured in a 50 L fermentation tank at 20° C., 150 r/min and natural pH for 60 h. 0.05% of streptomycin sulfate and 4% of trehalose were added to obtain a fermentation liquid with concentration of $1.4\times10^5$ cfu/mL or more.

3. Wheat seed priming: Wheat seeds were sterilized with 5% 84 disinfectant for 10 min, and washed with sterile water for three times, 1 min for each time; the wheat seeds were soaked in sterile water for 6 h till the wheat seeds absorbed water and swelled but did not begin to show white buds. The aqueous suspending agent of the virulent strain DT-8VF was evenly mixed with the wheat seeds and soaked the wheat seeds for 4 h at room temperature, the dosage was 500 mL of fermentation liquid for every 5 kg of wheat seeds, and then air drying was performed immediately to constant weight.

Figure 13:
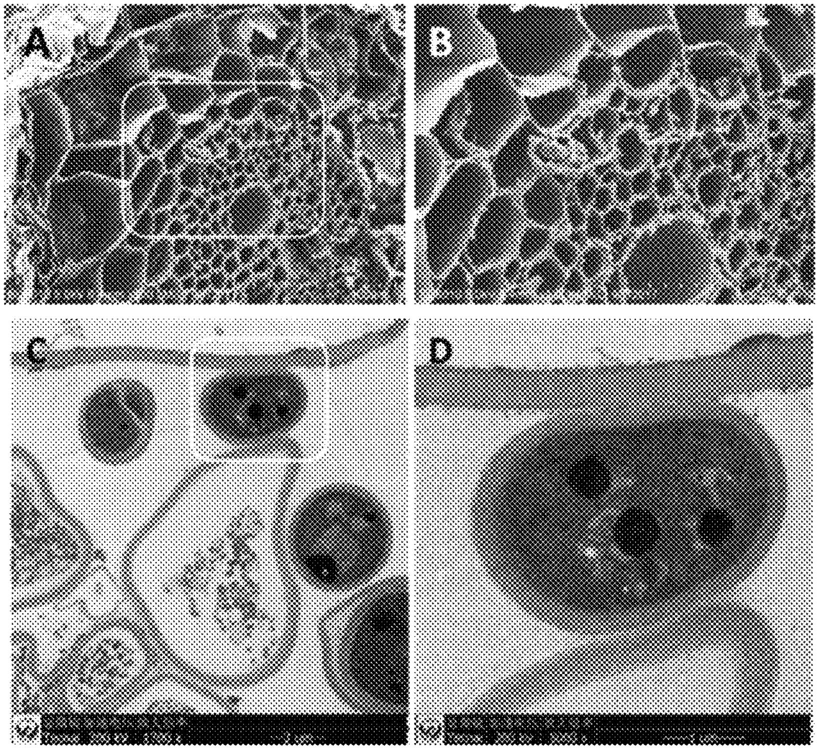
FIG. 13 shows the hyphae of *S. sclerotiorum* virulent strain DT-8VF inside wheat roots observed by an electron microscope in Embodiment 7.
Figure 14:
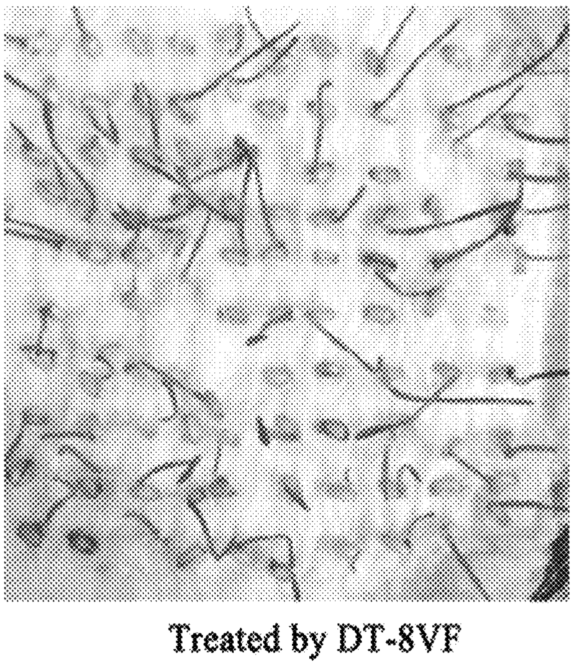
FIG. 14 is the effect of treatment with *S. Sclerotiorum* virulent strain DT-8VF on the germination of wheat seeds in Embodiment 8.
Figure 14:
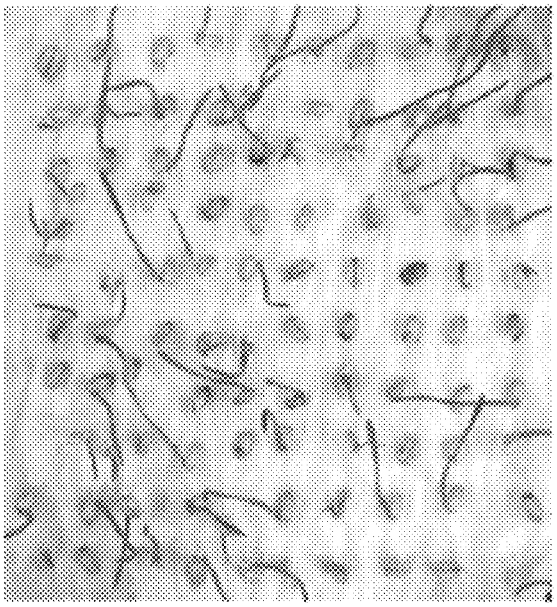

Embodiment 7: Seed Priming with the Virulent Strain DT-8VF Helped *S. sclerotiorum* to Grow Endogenously in Wheat 1. Observation of the Endogenous Growth of *S. sclerotiorum* Through Electron Microscopy Wheat was cultured on MS medium (Qingdao Hope Bio-Technology Co., Ltd.) for 7 d and inoculated with strain DT-8VF. Wheat root samples were observed through a scanning electron microscope and a transmission electron microscope. The results showed that hyphae of *S. sclerotiorum* existed in the intracellular and intercellular of wheat root, mainly concentrated in epidermal cells (FIG. 13). Therefore, *S. sclerotiorum* DT-8VF strain can grow in wheat root tissues.

Embodiment 8: Seed Priming with the Virulent Strain DT-8VF Promoted Wheat Growth 1. The Treatment with *S. sclerotiorum* DT-8VF had No Significant Effect on the Germination of Wheat Seeds The wheat seeds prepared in Embodiment 6 and the nontreated control were placed on a sterile filter paper and subjected to germinate for 5 d at 20° C. Each treatment had three parallel replicates, and 100 wheat seeds were used for each repetition. The number of germinated seeds in each parallel repeat was counted. The germination rate of wheat treated with *S. sclerotiorum* DT-8VF was 85% and 84% for the nontreated control (FIG. 13). The results showed that the treatment with *S. sclerotiorum* DT-8VF had no significant effect on the germination of wheat seeds.

2. The Treatment with *S. sclerotiorum* DT-8VF Promoted Wheat Growth

Figure 15:
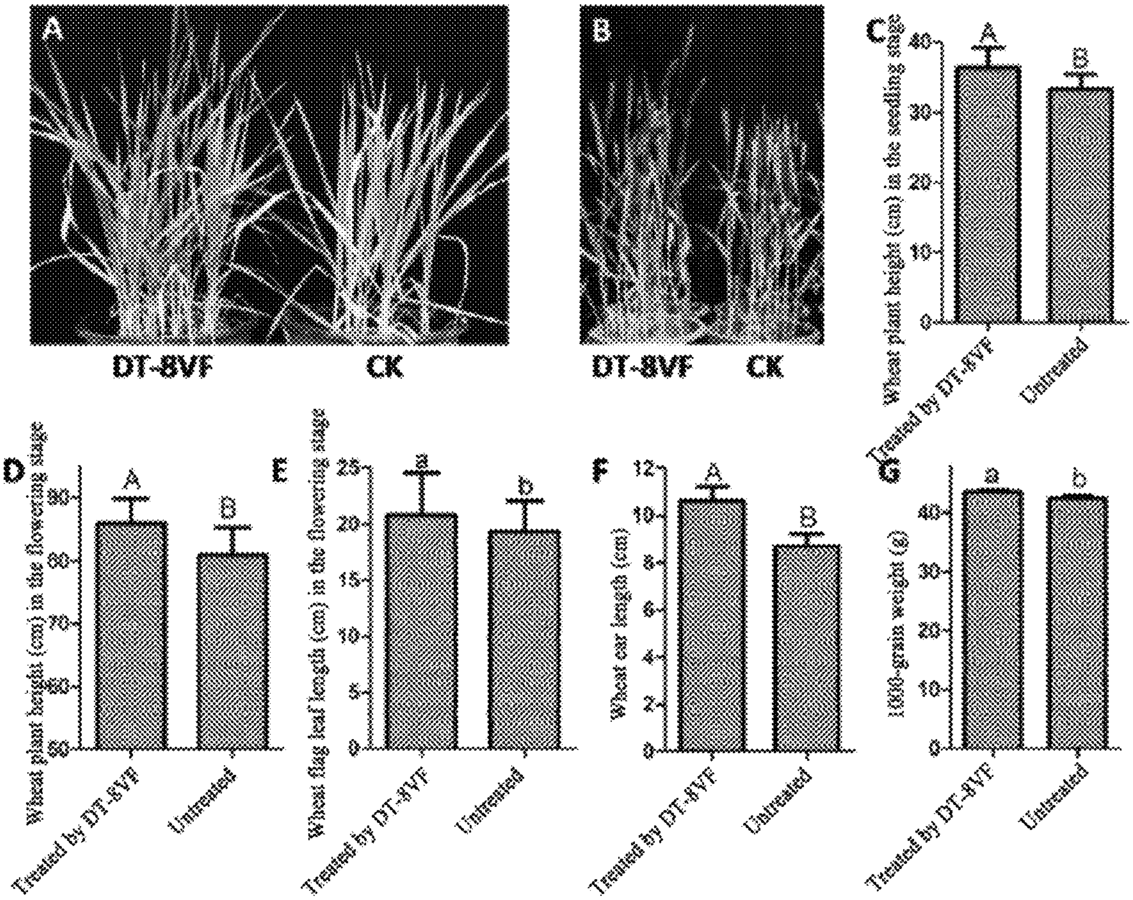
FIG. 15 shows the promotion effect in wheat treated with the virulent strain DT-8VF on wheat growth in Embodiment 8.

Wheat seeds prepared in Embodiment 6 and the nontreated control were cultivated in pots at 20° C. to observe the growth of wheat plants. The results showed that the plant height of wheat seeds treated with *S. sclerotiorum* DT-8VF at the seedling stage was significantly higher than that of the nontreated control. The plant height, the flag leaf length, the spike length and the 1000-grain weight of wheat treated were also significantly higher than those of the nontreated control (FIG. 15).

Figure 16:
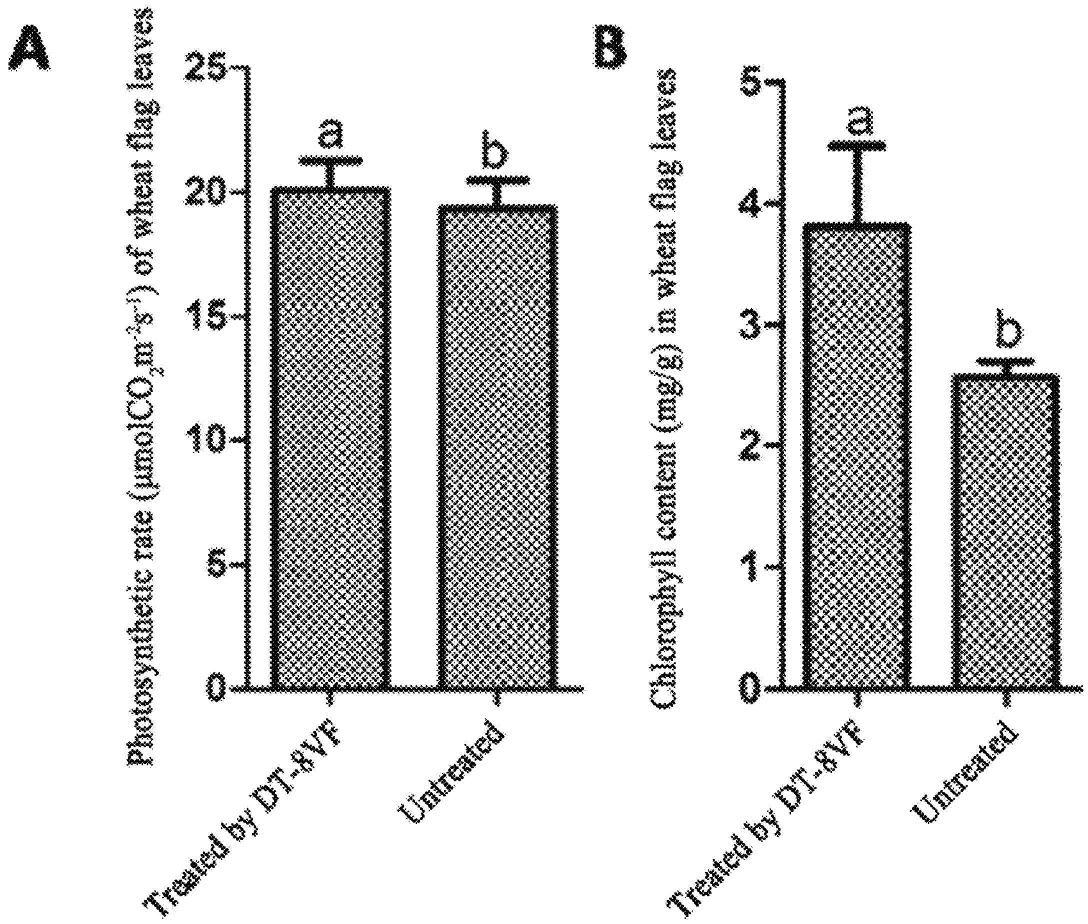
FIG. 16 shows the improvement of the photosynthetic rate and chlorophyll content in wheat flag leaves treated with the virulent strain DT-8VF in Embodiment 8.

3. The Treatment with *S. sclerotiorum* DT-8VF Improved Chlorophyll Content and Photosynthetic Rate in Wheat Flag Leaves Wheat seeds prepared in Embodiment 6 and the nontreated control were planted in experimental fields in E'zhou, Hubei Province. The chlorophyll content and photosynthetic rate of the flag leaves of wheat at the flowering stage were measured. The results showed that the chlorophyll content and photosynthetic rate of wheat treated with *S. sclerotiorum* DT-8VF were significantly higher than those of the nontreated control by 48.43% and 3.98%, respectively (FIG. 16).

Therefore, seed priming treatment with virulent strain DT-8VF of *S. sclerotiorum* has no significant effect on the germination of wheat seeds. The virulent strain DT-8VF of *S. sclerotiorum* can significantly improve the chlorophyll content in flag leaves and the photosynthetic rate, increase the wheat plant height, flag leaf length, spike length and 1000-grain weight, thus has obvious promotion effects on wheat growth.

Figure 17:
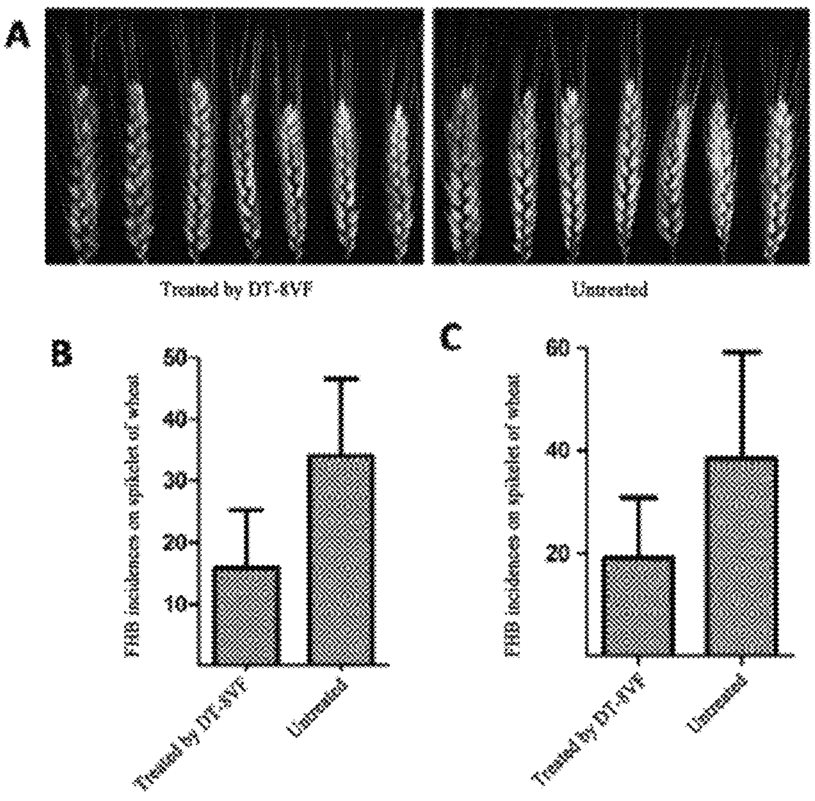
FIG. 17 shows the improvement of resistance to FHB in wheat treated with the virulent strain DT-8VF in Embodiment 9.

Embodiment 9: Seed Priming with the Virulent Strain DT-8VF Improved Disease Resistance of Wheat 1. Seed Priming with the Virulent Strain DT-8VF Improved Disease Resistance of Wheat to FHB Wheat seeds prepared in Embodiment 6 and the nontreated control were planted in experimental fields in E'zhou, Hubei Province in 2017 and 2018. Conventional field management was carried out and no fungicide was used to control fungal diseases throughout the growth period. The strain PH-1 of *F. gramincarum* was shaking incubated in CMC medium [15 g of carboxyl methyl cellulose (CMC), 1 g of yeast extract, 0.5 g of magnesium sulfate, 1 g of ammonium nitrate, 1 g of potassium dihydrogen phosphate, with distilled water added to a constant volume of 1 L] at 20° C. for 5 d to harvest the spores. The concentration of the spore suspension was adjusted to $10^5$/mL using a Hemocytometer. Artificial inoculation was carried out at the initial flowering stage of wheat: the fourth spikelet from bottom to top was selected, the inner glume was separated, 10 μL of spore suspension was added dropwise by using a pipet, water was sprayed and bagging was carried out to keep the humidity for 3 d, and the number of diseased spikelets was counted 14 days after inoculation. The results showed that the disease incidence in wheat treated with the virulent strain DT-8VF of *S. sclerotiorum* was significantly lower than that of the nontreated control, reducing by 50% (FIG. 17).

Wheat seeds prepared in Embodiment 6 and the nontreated control were cultured in the experimental fields in E'zhou, Hubei Province in 2017 and in Jingmen and Xiangyang, Hubei Province in 2018. Conventional management was carried out, but no fungicide was used to control fungal diseases. The FHB naturally occurring in 1500 ears was investigated randomly one week before wheat harvest. The investigation method was based on the national standard of scab field investigation statistics (GB/T 15796-2011).

Figure 18:
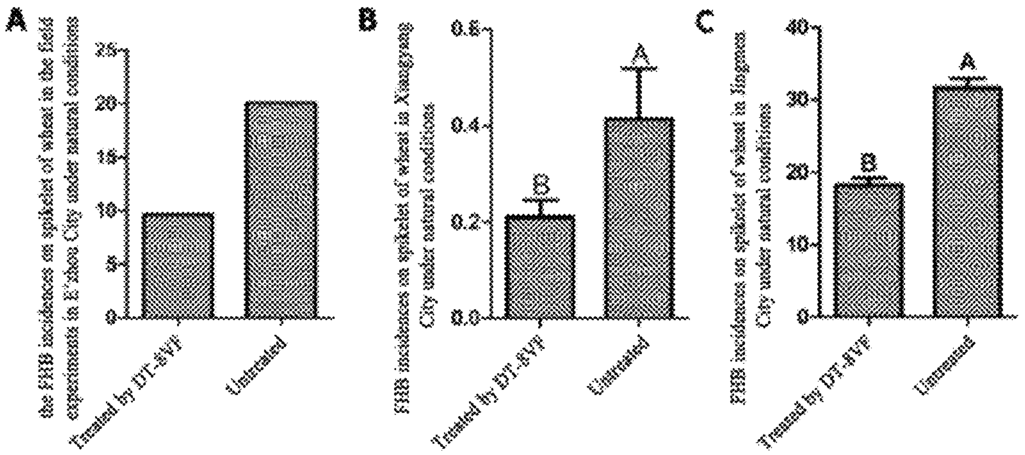
FIG. 18 shows the improvement of resistance to FHB in wheat treated with the virulent strain DT-8VF in the field experiments in Embodiment 9.

Survey results showed that the naturally occurring FHB incidences in wheat treated with *S. sclerotiorum* were significantly lower than that of the nontreated control, reducing by more than 42% (FIG. 18).

Figure 19:
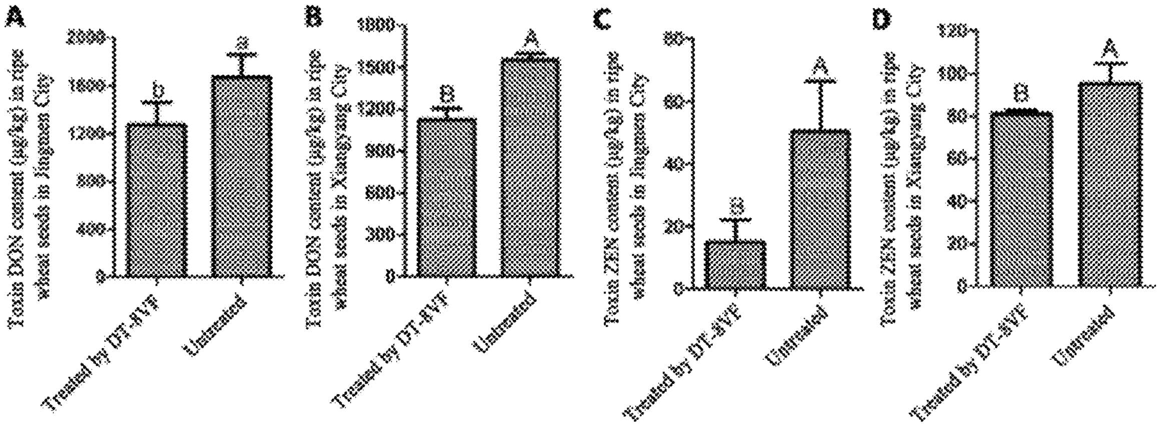
FIG. 19 shows the reduction of the toxin content in wheat seeds treated with the virulent strain DT-8VF in the field experiments in Embodiment 9.

The toxin content in wheat seeds treated with *S. sclerotiorum* in the experimental fields in Jingmen and Xiangyang was significantly lower than that of the nontreated control, reducing by 23.71% and 27.57% for DON, respectively, and by 70.21% and 14.91% for ZEN, respectively (FIG. 19).

The foregoing experiments showed that seed priming treatment with the virulent strain DT-8VF of *S. sclerotiorum* could greatly reduce the disease severity of FHB by at least 42% under the conditions of artificial inoculation and natural disease onset in the field, and could also greatly reduce the content of toxin in wheat seeds.

Figure 20:
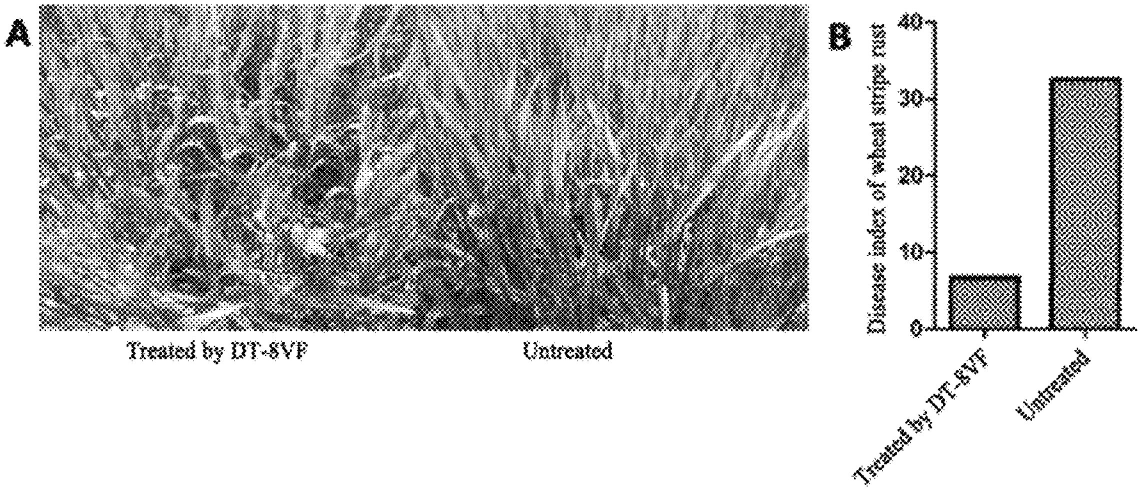
FIG. 20 shows the improvement of resistance to wheat stripe rust in wheat treated with the virulent strain DT-8VF in Embodiment 9.

2. Seed Priming with the Virulent Strain DT-8VF Improved Resistance of Wheat to Stripe Rust In 2017, wheat seeds prepared in Embodiment 6 and the nontreated control were planted in the experimental fields in E'zhou, Hubei Province. The outbreak of stripe rust in E'zhou was at the initial flowering stage in 2017. The results showed that compared with the nontreated control, the disease index of the stripe rust on flag leaves in wheat treated with strain DT-8VF decreased by 79.59% (FIG. 20).

Embodiment 10: Seed Priming the Virulent Strain DT-8VF Improved Wheat Yield

Wheat seeds prepared in Embodiment 6 and the nontreated control were planted for plot experiments (Zheng 9023) in E'zhou, Hubei Province in late October 2016. Six plots were set up for each treatment with each plot being 2×25 m. In late October 2017, plot experiments (Zheng 9023) were conducted in E'zhou, Jingmen, and Xiangyang, Hubei Province. For the experiment in E'zhou and Xiangyang, 6 plots were set up for each treatment with each plot being 2×30 m. For the experiment in Jingmen, 4 plots were set up for each treatment with each plot being 2×45 m. The wheat yield per 5 square meters of field was measured in all plots (Table 4). The results showed that the yields in wheat treated with *S. sclerotiorum* were significantly higher than those in the nontreated control with the yield increasing range from 2.33% to 16.81%.

TABLE 4

Wheat yield after treated with the virulent strain DT-8VF of *S sclerotiorum*

| Time | Variety | Location | Yield DT-8VF-treated (g) | Yield Nontreated control (g) | Yield increasing (%) |
|---|---|---|---|---|---|
| 2016-2017 | Zheng 9023 | E'zhou, Hubei Province | 1850.00 ± 165.66 | 1808.38 ± 111.71 | 2.33 |
| 2017-2018 | Zheng 9023 | E'zhon, Hubei Province | 2091.79 ± 193.17 | 1790.33 ± 70.22 | 16.81 |
| 2017-2018 | Zheng 9023 | Jingmen, Hubei Province | 2043.07 ± 69.78 | 1890.22 ± 124.36 | 8.08 |
| 2017-2018 | Zheng 9023 | Xiangyang, Hubei Province | 2041.79 ± 103.75 | 1894.75 ± 66.53 | 7.76 |

The above mentioned are only preferred embodiments of the present invention, and it should be noted that those skilled in the art can also make several improvements and retouchings without departing from the principles of the present invention. These improvements and retouchings should also be considered as falling within the protection scope of the present invention.

SEQUENCE LISTING

<110> HuaZhong Agricultural University
<120> Method for increasing wheat yield and preventing wheat diseases and use thereof
<130> GWP201909386
<150> 201910435218.2
<151> 2019-05-23
<160> 2
<170> PatentIn version 3.5
<210> 1
<211> 20
<212> DNA
<213> artificial sequence
<220>
<223> XJJ21
<400> 1
gttgctttgg cgtgctgctc 20
<210> 2
<211> 25
<212> DNA
<213> artificial sequence
<220>
<223> XJJ 222
<400> 2
ctgacatgga ctcaatacca atctg 25

```
                              SEQUENCE LISTING


<160> NUMBER OF SEQ ID NOS: 2

<210> SEQ ID NO 1
<211> LENGTH: 20
<212> TYPE: DNA
<213> ORGANISM: artificial sequence
<220> FEATURE:
<223> OTHER INFORMATION: S. sclerotorium specific primer XJJ21

<400> SEQUENCE: 1

gttgctttgg cgtgctgctc                                                20


<210> SEQ ID NO 2
<211> LENGTH: 25
<212> TYPE: DNA
<213> ORGANISM: artificial sequence
<220> FEATURE:
<223> OTHER INFORMATION: S. sclerotorium specific primer XJJ222

<400> SEQUENCE: 2

ctgacatgga ctcaatacca atctg                                          25
```

The invention claimed is:

1. A method for increasing wheat yield, wherein wheat seeds are primed by a fermentation liquid of *S. sclerotiorum* comprising hypovirulent strain DT-8, and the concentration of the fermentation liquid is at least $1.4\times10^5$ colony-forming units per milliliter (cfu/mL).

2. The method according to claim 1, wherein a method for preparing the fermentation liquid of the *S. sclerotiorum* comprises:

inoculating the *S. sclerotiorum* strain into a liquid medium, and fermenting at 18-22° C. to obtain a fermentation liquid of *S. sclerotiorum* with the concentration of at least $1.4\times10^5$ cfu/mL.

3. The method according to claim 2, wherein fermentation time is 70-96 hours.

4. The method according to claim 2, wherein the fermentation is accompanied by stirring with a stirring speed of 180-210 revolutions per minute (r/min).

5. The method according to claim 1, wherein priming of the wheat seeds comprises the following steps:

(1) sterilizing surfaces of wheat seeds to be treated and then soaking the wheat seeds in water to obtain water-absorbing wheat seeds after the wheat seeds absorb water and swell but do not begin to show white buds; and (2) soaking the water-absorbing wheat seeds for 3-6 hours with the fermentation liquid of the *S. sclerotiorum*, and then drying to constant weight.

6. The method according to claim 2, wherein priming of the wheat seeds comprises the following steps:

(1) sterilizing surfaces of wheat seeds and then soaking the wheat seeds in water to obtain water-absorbing wheat seeds until the seeds become swell but do not begin to show white buds; and (2) soaking the water-absorbing wheat seeds for 3-6 hours with the fermentation liquid of *S. sclerotiorum*, and then drying to constant weight.

7. The method according to claim 3, wherein the priming of the wheat seeds comprises the following steps:

(1) sterilizing surfaces of wheat seeds and then soaking the wheat seeds in water until the seeds become swell but do not begin to show white buds; and (2) soaking the water-absorbing wheat seeds for 3-6 hours with the fermentation liquid of *S. sclerotiorum*, and then drying to constant weight.

8. The method according to claim 5, wherein in step (1), the soaking in water is 5-8 hours.

9. The method according to claim 5, wherein in step (2), a dosage form of the fermentation liquid of the *S. sclerotiorum* is an aqueous suspending agent.

10. The method according to claim 9, wherein in step (2), in addition to the fermentation liquid of the *S. sclerotiorum*, the aqueous suspending agent also comprises a preservative, a protective agent and a mildew inhibitor.

11. The method according to claim 5, wherein a ratio of a volume of the fermentation liquid of the *S. sclerotiorum* to a weight of the wheat seeds to be treated is 80-150 mL:1 kg.

* * * * *